Sept. 7, 1965

I. N. HURST 3,205,383

SYNCHRONOUS HYSTERESIS ELECTRIC MOTOR

Filed June 26, 1961

INVENTOR.
Ira Newton Hurst
BY
Stone, Nierman,
Burmeister & Zummer
Attorneys

Sept. 7, 1965 I. N. HURST 3,205,383
SYNCHRONOUS HYSTERESIS ELECTRIC MOTOR
Filed June 26, 1961 2 Sheets-Sheet 2
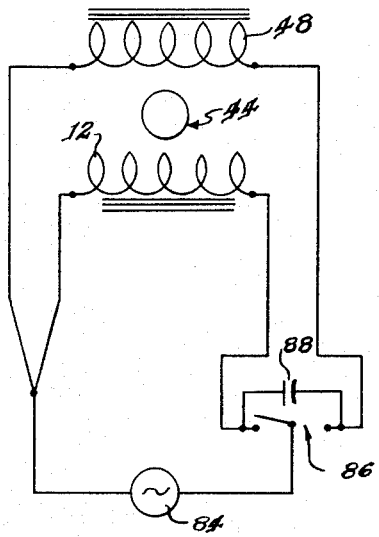
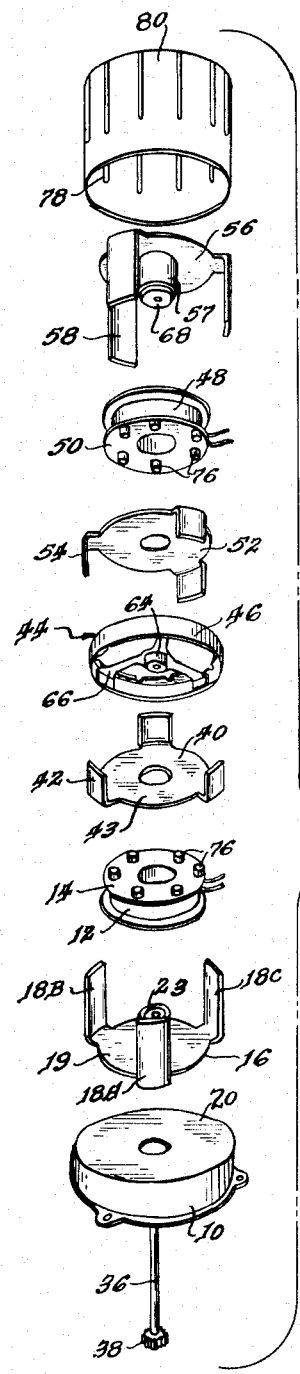
INVENTOR.
Ira Newton Hurst
BY
Stone, Nierman,
Burmeister & Zummer
Attorneys

United States Patent Office 3,205,383
Patented Sept. 7, 1965

3,205,383
SYNCHRONOUS HYSTERESIS ELECTRIC MOTOR
Ira Newton Hurst, Princeton, Ind., assignor to Hurst
Manufacturing Corporation, Princeton, Ind., a corporation of Indiana
Filed June 26, 1961, Ser. No. 119,371
2 Claims. (Cl. 310—162)

The present invention relates to synchronous electric motors of the hysteresis type, and also to reversible electric motors.

United States Patent No. 2,160,076 issued to Lux discloses an electric motor which utilizes a cylindrical rotor of high remanence material which is rotatably mounted within a magnetic core. The magnetic core has a plurality of pole pieces which extend close to the cylindrical surface of the rotor, and each of these pole pieces is provided with a coil disposed thereabout for the purpose of providing a periodic alternating source of magnetomotive force. Separate sources of magnetomotive force are provided so that different magnetic poles are established in the rotor as a result of the flux flowing from one pole, through the rotor, and to an adjacent pole of opposite magnetic polarity. Starting torque is provided by providing a shaded pole adjacent to an unshaded pole for each pole piece. Since each of the coils of the magnetic source are connected in series and to an alternating electrical current generator, the unshaded poles progress about the rotor with magnetic polarities differing by fixed increments. The shaded poles obtain their magnetic polarities from the unshaded poles, and differ from their respective poles by a fixed phase increment.

A motor of the type disclosed in the Lux patent has a number of disadvantages. In order to provide magnetic potential gradients about the rotor, separate coils have been provided for each pole piece. As a result, the cost of the motor is greatly increased particularly since the coils must be disposed about pole pieces which project radially inwardly from a circular magnetic core. It is one of the objects of the present invention to provide a hysteresis type electric motor which requires substantially fewer coils, and which can readily be constructed at a lower cost than motors of this type previously known.

Another disadvantage of the motor disclosed in the Lux patent referred to above is that it is not readily reversible. The starting torque of the motor results from the magnetic potential gradient which exists between the shaded and unshaded poles of the pole pieces as a result of the difference in phase between these magnetic poles. Since the magnetic potential of the shaded pole is derived from the unshaded pole by means of the shading coil mounted on that pole piece, the shaded pole can only lag the unshaded pole. As a result, it has not been practical to construct a reversible motor of this type. It is an object of this invention to provide a reversible hysteresis electric motor.

It is also to be noted that the construction of shaded poles of the Lux motor introduce mechanical complications. Not only must each pole piece be bifurcated and provided with a shading coil, but also a magnetic bridge from each shaded pole to the adjacent unshaded pole has been found desirable. Without this bridge, the magnetic potential of a shaded pole is substantially below that of its associated nonshaded pole. It is a further object of the present invention to provide a hysteresis electric motor with pole pieces of substantially simpler construction.

These and further objects and advantages of the present invention will become readily apparent to those skilled in the art from a further reading of this disclosure, particularly when viewed in the light of the drawings, in which:

FIGURE 4 is an exploded view illustrating the elements of the motor illustrated in FIGURES 1 through 3; and FIGURE 5 is a schematic electrical circuit diagram illustrating the electrical connections for the motor of FIGURES 1 through 4.

Figure 1:
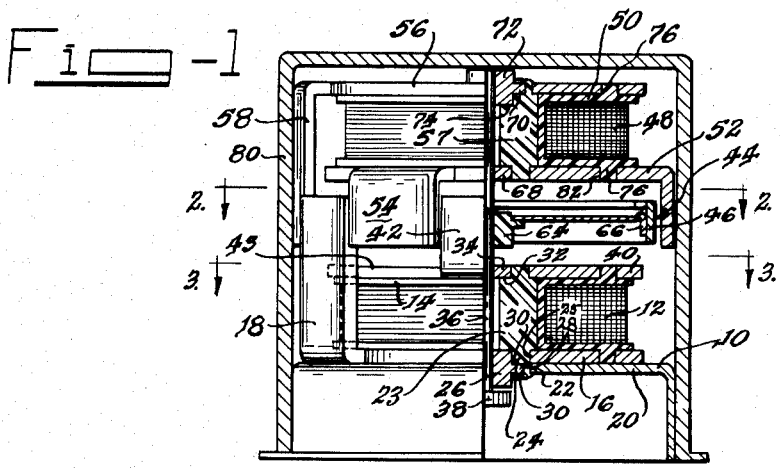
FIGURE 1 is a sectional view of a motor constructed according to the teachings of the present invention, a portion of the structure within the motor casing being shown in elevation.

As illustrated in FIGURES 1 and 4, the motor is mounted on a cup shaped base plate 10 which is adapted to contain the gears of a speed reducing train. Since gear reducing trains are conventional, these details have not been illustrated. A first coil 12 is wound on a bobbin 14 of electrically insulating material, such as plastic, and disposed adjacent to the cup shaped base 10. A first yoke 16 of ferromagnetic material is disposed between the coil bobbin 14 and the base 10, and the yoke 16 has a plurality of pole pieces 18 which extend upwardly about the coil 12 from the periphery of a circular portion 19. In the particular construction herein described, the yoke 16 has three such pole pieces 18, but it will be apparent from the following description that the motor may be constructed with more or fewer pole pieces on the yoke.

The cup shaped base 10 is provided with a circular central portion 20, and the central portion 20 has a central aperture 22. The yoke 16 has an annular core 23 of ferromagnetic material with a protruding ring 24 which extends through a central opening 25 in the central portion 19 of the yoke 16 and through the aperture 22 in the base 10. A bearing 26 is force fiitted within the protruding ring 24 of the core 23. The ring 24 is provided with a recess 28 which engages a shoulder 30 of the bearing 26.

The core 23 also is provided with a recess 32 on the side thereof opposite the bearing 26, and a second bearing 34 is snugly fitted within the recess 32. A shaft 36 is journaled within the bearings 26 and 34, and a pinion gear 38 is fixedly mounted on the end of the shaft adjacent to the bearing 26.

A second yoke 40 is mounted on the core 23 on the side of the coil 12 opposite the first yoke 16. The second yoke 40 has a plurality of pole pieces 42 extending from a circular portion 43 in a direction away from the coil 12 and parallel to the pole pieces 18 of the first yoke. There are an equal number of pole pieces 42 as pole pieces 18, and the pole pieces 42 are disposed between adjacent pole pieces 18. The rotor 44 is fixedly mounted on the shaft 36 adjacent to the yoke 40, and the rotor 44 is disposed within and confronting the pole pieces 18 and 42. The rotor 44 has a cylindrical rim 46 constructed of high remanence material, such as steel, and the rim 46 completes the magnetic circuit from the core 23, through the first yoke 16, the pole pieces 18, the rim 46, the pole pieces 42, and the second yoke 40. The coil 12 and the magnetic core 23 form a source of magnetomotive force in this magnetic circuit.

As thus described, the motor would possess no starting torque since it is necessary to impress a second phase alternating magnetic field on the rotor 44. If each of the pole pieces of the yoke 16 and 40 were bifurcated and provided with a shading coil, this motor could be made to operate much in the same manner of the motor described in the Lux patent referred to above. According to the present invention, however, the second phase magnetic flux is provided by a second source of magnetomotive force in the form of a second coil 48 mounted on the opposite side of the rotor 44 from the coil 12. An exciting electrical current is supplied to second coil 48 out of phase with the current supplied to the coil 12 as will be hereinafter more fully explained. The second coil 48 is wound upon a second bobbin 50, and a third yoke 52 is disposed between the second coil 48 and the rotor 44. The third yoke 52 is of similar construction to the second yoke 40 and has pole pieces 54 which extend to confront the rotor 44. Each of the pole pieces 54 is disposed between a pole piece 18 and a pole piece 42. In like manner, a fourth yoke 56 of similar construction to the first yoke 16 is disposed adjacent to the second coil 48 on the side thereof opposite the third yoke. The fourth yoke 56 also has a magnetic core 57 which is mounted thereon and extends through a central channel of the bobbin 50 to engage the third yoke 52. The fourth yoke 56 is provided with a plurality of pole pieces 58 which extend toward the rotor 44 and confront the rim 46 of the rotor 44.

Figure 2:
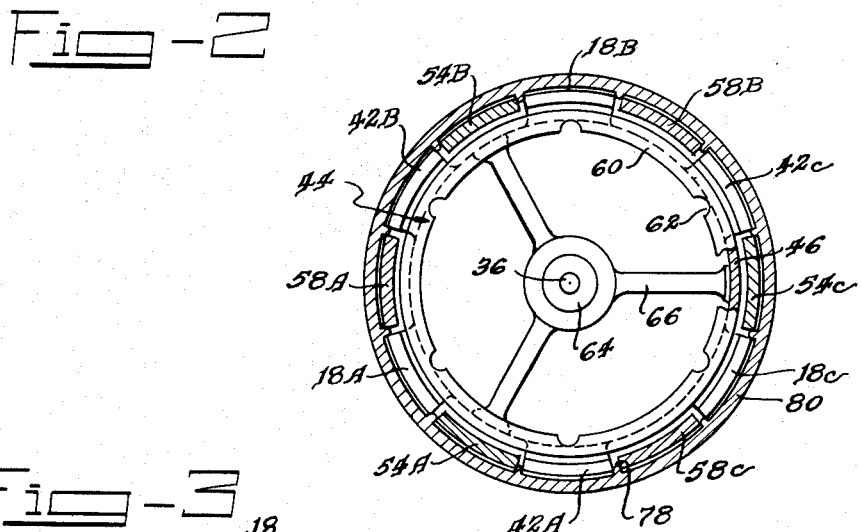
FIGURE 2 is a sectional view taken along the line 2—2 of FIGURE 1.
Figure 3:
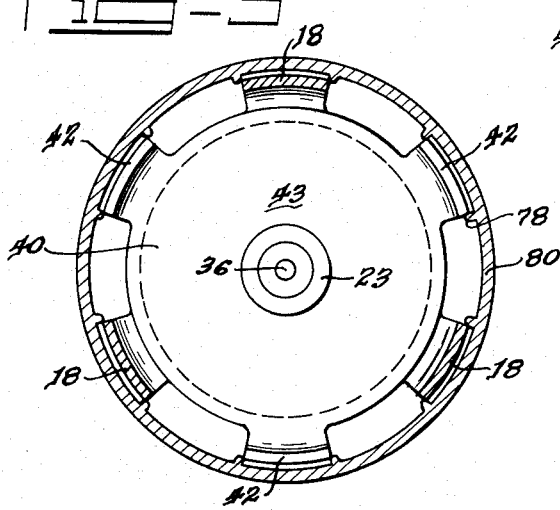
FIGURE 3 is a fragmentary sectional view taken along the line 3—3 of FIGURE 1.

It is to be noted that there are an equal number of pole pieces 18, 42, 54 and 58, and in the particular construction there are three of each of these pole pieces. FIGURE 2 illustrates the relative position of these pole pieces, and for convenience the three pole pieces attached to each yoke have been designated by the letters A, B, and C. In FIGURE 2, it will be noted that the pole piece 42A is disposed between the pole pieces 54A and 58C, the pole piece 42B is disposed between the pole pieces 58A and 54B, and the pole piece 42C is disposed between the pole pieces 58B and 54C. In like manner, the pole piece 54A is disposed between the pole pieces 18A and 42A, the pole piece 54B is disposed between the pole pieces 18B and 42B, and the pole piece 54C is disposed between the pole pieces 18C and 42C. In like manner, the pole piece 18A is disposed between the pole pieces 58A and 54A, and the pole piece 18B is disposed between the pole pieces 58B and 54B, and the pole piece 18C is disposed between the pole pieces 58C and 54C. Also, the pole piece 58A is disposed between the pole piece 18A and the pole piece 42B, pole piece 58B is disposed between the pole piece 42C and the pole piece 18B, and the pole piece 58C is disposed between the pole piece 42A and the pole piece 18C.

The rotor 44 is disposed immediately adjacent, but spaced from, each of the pole pieces 18, 42, 54 and 58, and the rotor 44 has a ring 60 extending toward the axis of the rotor from one edge of the rim 46. The ring is provided with indentations 62 at equal intervals thereabout equal in number to one-half the number of pole pieces, or six in the present construction. The indentations 62 are provided to limit slipping of the rotor as the magnetic field rotates about the pole pieces. The rotor 44 is mounted on the shaft 36 by a hub 64 so that the rotor 44 rotates with the shaft 36. A plurality of spokes 66 of non-magnetic material, such as brass, extend between the hub 64 and the rim 46 of the rotor.

The shaft 36 extends through a third bearing 68 which is mounted in an indentation coaxially disposed within the core 57 of the yoke 56, in a manner similar to the second bearing 34. The end of the shaft 36 opposite the bearing 26 is also journaled within a fourth bearing 72 which is identical in construction to the first bearing 26 and which is mounted in a circular indentation 74 disposed within the end of the magnetic core 57 on the opposite side of the third bearing 68.

The pole pieces 18, 42, 54 and 58 are maintained in position by protruding bosses 76 which protrude from the surfaces of the bobbins 14 and 50, and by ribs 78 which protrude inwardly from a cylindrical casing 80 disposed about the motor. The bosses 76 extend into apertures 82 in the yokes 16, 42, 54 and 58 and maintain the yokes in proper alignment relative to each other. Also, the pole pieces of the four yokes are disposed normal to the planes of the circular central portions of the yokes which abut the bobbins 14 and 50, and the exterior surfaces of the pole pieces abut the interior surface of the cylindrical casing 80. It is therefore necessary that the cylindrical casing 80 be constructed of non-magnetic material, such as brass or plastic. The ribs 78 are disposed on straight lines which are parallel to each other and are spaced at equal intervals, so that each rib is disposed between two pole pieces and maintains the pole piece in proper position.

The motor may be operated by connecting the coil 12 to a first source of alternating current and the coil 48 to a second source of alternating current which is at a different phase than the first source, or in other words, the motor may be operated from a two-phase alternating current source. In FIGURE 5, the motor is illustrated connected to a single phase alternating current source in the form of a generator 84. One end of coil 12 and coil 48 are connected to one terminal of the generator 84, and the other end of the coil 12 is connected to one stationary contact of a single pole double throw switch 86 while the other end of the coil 48 is connected to the other stationary contact of the switch 86. A capacitor 88 is also connected between the stationary contacts of the switch 86. When the switch 86 is in a position connecting the generator 84 directly across the winding of the coil 48, the capacitor 88 is connected in series with the coil 12, thereby providing a phase shift for the current flowing through the coil 12 and producing the necessary rotating magnetic field to provide rotation of the rotor 44 of the motor in a first direction. When the switch is reversed and the coil 12 directly connected across the generator 84, the phase relation between the coils 12 and 48 is reversed, that is, the phase of the current flowing through the coil 12 is made to lag the phase of the current flowing through the coil 48, rather than lead, thereby reversing the direction of rotation of the rotor 44.

It is apparent that the inventor has provided a simple and compact electrical motor, which may be constructed readily by mass production techniques. Further, the motor here disclosed may be used either with two phase alternating current, or with single phase alternating current. In either event, the direction of the motor may be reversed by simply providing the leading current flow in the other coil.

Those skilled in the art will readily devise many modifications and applications for the presently disclosed motor. For example, it is apparent that the coils 12 and 48 need not be stacked directly over each other, as in the preferred construction, and that other configurations can be used. For example, the coil 12 may be disposed coaxially within the coil 48. Further, the pole pieces may be disposed on both sides of the rotor or totally on the interior side of the rotor. It is therefore intended that the scope of the present invention be not limited by the foregoing disclosure, but rather only by the appended claims.

The invention claimed is:

1. A synchronous electric motor comprising, in combination, a housing having a cup-shaped base with a cylindrical peripheral surface and a flat central surface, and a cylindrical casing of non-magnetic material engaging the peripheral surface and extending therefrom forming a cavity with the central surface of the base, said central surface having an aperture on the axis of the peripheral portion of the base, and said casing having a plurality of spaced ribs extending into the cavity at equal intervals and parallel to the axis of the casing; a first yoke of magnetically permeable material having a circular flat central portion abutting the flat central portion of the base and an opening coaxial with the aperture of the base, said yoke having a plurality of equally spaced pole pieces extending from the periphery of the central portion normally therefrom and away from the base and a plurality of apertures extending through the flat disc of the first yoke about the center of the flat disc, each of said pole pieces abutting the casing and being disposed between two ribs thereof; a first hollow cylindrical core of magnetically permeable material mounted within the opening of the yoke and extending normally from the central portion thereof and from the base; a bobbin of electrically insulating material having a central channel extending therethrough, the channel of said bobbin being snugly disposed about the first core, said bobbin terminating on flat surfaces normal to the channel and each of said flat surfaces having a plurality of outwardly extended bosses, one of said surfaces abutting the first yoke and the bosses thereof being disposed in the apertures of the first yoke; a first coil of electrically conducting wire wound about the first bobbin; a second yoke of magnetically permeable material having a flat circular central portion provided with a plurality of apertures extending through the flat central portion about the center thereof, said second yoke abutting the other flat surface of the bobbin with the bosses of the first bobbin disposed within the apertures of the second yoke, said second yoke having a central opening disposed in said flat circular central portion engaging the end of the first core opposite the first yoke, said second yoke having a plurality of equally spaced pole pieces equal in number to the pole pieces of the first yoke extending from the periphery of the central portion thereof in the same direction as the pole pieces of the first yoke, each pole piece of the second yoke abutting the casing between two ribs which are separated from a pole piece of the first yoke by one rib; a third yoke having a flat central portion with a central opening therein and a plurality of apertures extending through the flat central portion thereof, said third yoke being mounted within the casing remote from the base, said third yoke having a plurality of pole pieces equal in number to the pole pieces of the first and second yokes extending normally from the periphery of the central portion thereof toward the base, each of said pole pieces of the third yoke abutting the wall of the casing and extending between two ribs thereof to a region between a portion of a pole piece of the first yoke and a portion of the pole piece of the second yoke; a second magnetically permeable hollow cylindrical core mounted within the opening of the third yoke and extending toward the base; a second bobbin of electrically insulating material having a channel therein snugly engaging the second core, said bobbin terminating on flat surfaces normal to the core, each of said flat surfaces having a plurality of outwardly extending bosses, and one of said flat surfaces abutting the central portion of the third yoke with the bosses of said surface disposed in the apertures of the third yoke; a second coil of electrically conducting material wound about the bobbin; a fourth yoke of magnetically permeable material having a flat central portion provided with a plurality of spaced apertures extending therethrough, said fourth yoke abutting the bobbin opposite the third yoke with the bosses of the second bobbin disposed within the apertures of the fourth yoke, said fourth yoke having a central opening engaging the end of the second core opposite the third yoke, said fourth yoke having a plurality of pole pieces equal in number to the pole pieces of the first, second, and third yokes extending normally from the periphery of the central portion toward the base, each of said pole pieces of the fourth yoke abutting the casing between a pair of ribs thereof and extending between a portion of a pole piece of the first yoke and a portion of a pole piece of the second yoke; a first bearing mounted in the first core; a second bearing mounted in the second core; a shaft journaled within the bearings; and a rotor mounted on the shaft having a cylindrical portion of magnetic material of high remanence coaxial with the shaft disposed in spaced confronting relation with a portion of each pole piece of all four yokes.

2. An electrical motor comprising, in combination, a first magnetic yoke having a flat portion with an opening therein and a plurality of apertures extending therethrough disposed about the opening, a hollow cylindrical core mounted on the yoke about the opening and extending normally from the flat portion of the yoke, said yoke having a plurality of pole pieces extending from the perimeter of the flat portion of the pole piece parallel to the core, a circular rotor having a portion of magnetic material of high remanence confronting the pole pieces of the first yoke, a shaft journaled within the hollow core and mounted on the rotor at its center, a coil disposed about the magnetic core adapted to be electrically connected to an alternating current source, a second yoke having a flat central portion provided with a plurality of apertures extending therethrough mounted on the core on the opposite side of the coil from the first yoke and having a plurality of pole pieces equal in number to the pole pieces of the first yoke, said coil having a plurality of bosses extending from opposite sides thereof disposed in the apertures of the first and second yoke, respectively, and maintaining the first and second yoke in fixed position relative to each other, each of said pole pieces of the second yoke confronting the rotor between two adjacent pole pieces of the first yoke, each of the pole pieces of the first yoke being in a magnetic circuit with a pole piece of the second yoke and a portion of the rotor, a second core, a second coil disposed about the second core having a plurality of bosses extending therefrom on opposite sides thereof, means for maintaining the second coil in fixed position relative to the first coil, a third magnetic yoke having a flat portion having a plurality of apertures and a plurality of pole pieces extending from the perimeter of the flat portion parallel to the core equal in number to the pole pieces of the first yoke and second yoke, each pole piece of the third yoke confronting the rotor between pole pieces of the first yoke and second yoke, and a fourth magnetic yoke having a flat portion having a plurality of apertures mounted on the end of the second core opposite the third yoke, the bosses of the second coil being disposed within the apertures of the third and fourth yokes, respectively, said fourth yoke having a plurality of pole pieces extending from the perimeter of the flat portion of the yoke parallel to the core equal in number to the number of pole pieces of the first yoke, second yoke, and third yoke, each pole piece of the fourth yoke confronting the rotor between pole pieces of the first yoke and second yoke, and means including an electrical phase shift interconnecting the first coil and second coil.

References Cited by the Examiner

UNITED STATES PATENTS

| | | | |
|---|---|---|---|
| 2,460,358 | 2/49 | Packard | 310—164 |
| 2,465,042 | 3/49 | Schlenker | 310—162 |
| 2,793,307 | 5/57 | Gallagher | 310—164 |
| 2,814,746 | 11/57 | Boerdijk | 310—164 |
| 2,981,855 | 4/61 | Van Lieschout et al | 310—162 |
| 3,092,743 | 6/63 | Van Utt et al. | 310—164 |

FOREIGN PATENTS

| | | |
|---|---|---|
| 319,684 | 5/30 | Great Britain. |
| 867,659 | 5/61 | Great Britain. |

MILTON O. HIRSHFIELD, *Primary Examiner.*